United States Patent [19]

Häfner et al.

[11] 4,317,970
[45] Mar. 2, 1982

[54] ENTRAPMENT PREVENTION DEVICE

[75] Inventors: Manfred Häfner, Merzhausen; Heinz Hunold, Waldkirch, both of Fed. Rep. of Germany

[73] Assignee: Erwin Sick GmbH Optik-Elektronik, Waldkirch, Fed. Rep. of Germany

[21] Appl. No.: 125,211

[22] Filed: Feb. 27, 1980

[30] Foreign Application Priority Data

Mar. 5, 1979 [DE] Fed. Rep. of Germany ....... 2908471

[51] Int. Cl.³ .............................................. H01H 3/16
[52] U.S. Cl. ................................. 200/61.43; 200/86 R
[58] Field of Search ............... 200/61.43, 61.16, 86 R; 49/26, 27, 28

[56] References Cited

U.S. PATENT DOCUMENTS

| | | | |
|---|---|---|---|
| 2,437,969 | 1/1946 | Paul | 200/86 R |
| 2,790,872 | 12/1953 | Helsper | 200/86 R |
| 2,843,694 | 8/1954 | Bertaux | 200/61.43 |
| 2,896,042 | 3/1958 | Koenig | 200/86 R |
| 3,321,592 | 7/1966 | Miller | 200/61.43 |

Primary Examiner—J. D. Miller
Assistant Examiner—D. L. Rebsch

[57] ABSTRACT

An entrapment prevention device for ensuring that people or obstacles do not become trapped in the path of automatic doors, windows and the like features an elongate sensor which can be fitted along an edge of an opening or of a closure member adapted to close the opening.

The sensor features a pair 11 of electrically conductive bands 13 and 14 which are held spaced apart and facing each other by insulating strips 17 with the pair of bands being wound in helical form round a core 12 to form an elongate structure. A series of transverse slots are provided in the surface of the radially outer band 14 so that the remaining web portions 15 can be easily deflected by light contact pressure to electrically contact the radially inner band 14. This electrical contact is sensed by a monitoring circuit 24 which energizes a relay 26 to stop or reverse the automatic drive. The pair of bands 11 is surrounded by an outer helically wound resilient cushion 18 and is enclosed in a continuous outer sleeve 19.

26 Claims, 3 Drawing Figures

U.S. Patent    Mar. 2, 1982    4,317,970
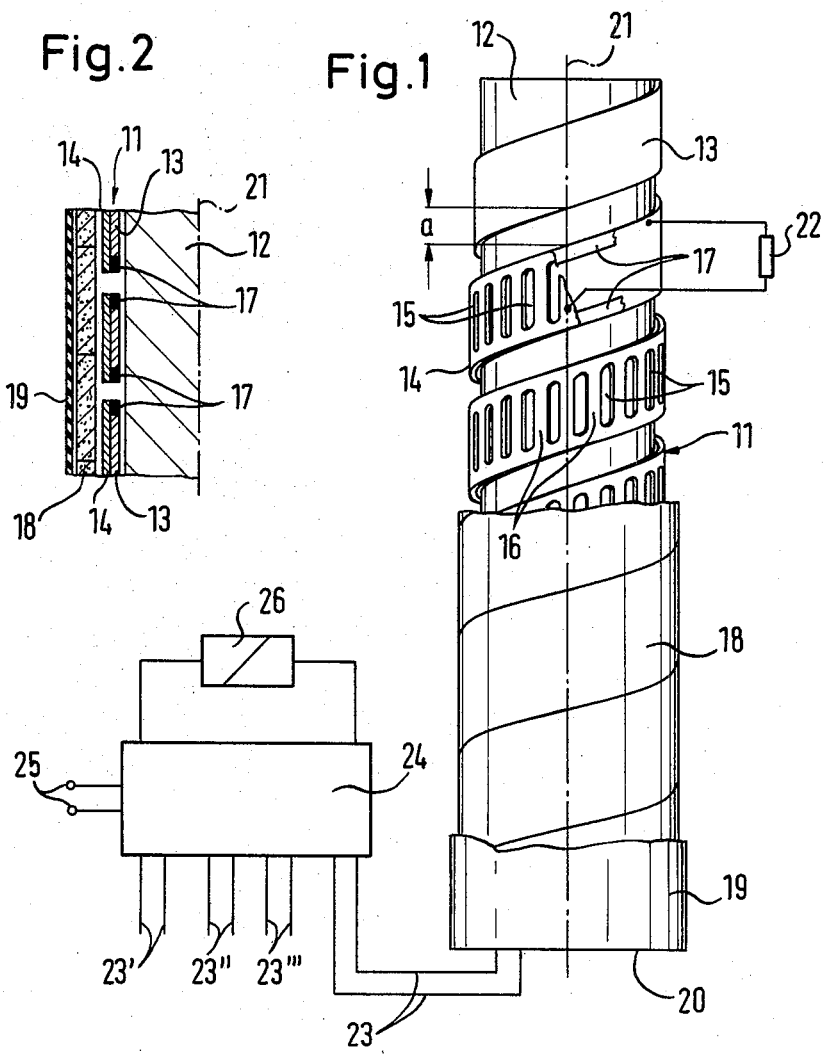

ENTRAPMENT PREVENTION DEVICE

The invention relates to an entrapment prevention device for fastening to edge means associated with a closable opening and has particular reference to a device comprising first and second electrically conductive bands of which at least one is resilient and in which the bands are held spaced apart and facing each other but are adapted so as to contact one another on the application of pressure, there being a monitoring circuit capable of detecting said contact. The present invention also relates to a sensor for use in an entrapment prevention device as aforesaid.

It will be appreciated that there are many situations in which it is necessary to ensure that a person or an obstacle does not become trapped in a closable opening during movement of a closure member such as a door, window or lid. Entrapment prevention devices are already known in the form of strips which can be applied to one or other of the edge of the opening or of the associated closure member. In one known arrangement which is described in German DE-OS No. 23 07 375 there is provided a sensor for an entrapment prevention device in the form or a resilient tube which is arranged along the edge of an automatic door. A pneumatic pressure wave is generated on contact with an obstacle and propagates along the tube into a switch housing where it actuates a switch contact connected to stop or reverse the drive for the door. This known entrapment prevention device has the significant disadvantage that the tube requires to be pressurized and even trival damage to the tube results in a loss of pressure so that the device is completely useless. Furthermore, this known device reacts either not at all or only poorly to a gradually applied mechanical load and is very temperature dependent.

Another entrapment prevention device is described in German DE-OS No. 27 19 438. This arrangement includes two metallic contact bands which are held spaced apart by resilient strips of insulation. The two contact bands are connected to a monitoring device which initiates a stop or reverse signal for the door drive following contact between the two contact bands. The two metallic contact bands are bridged by a passive resistance, so that a quiescent current always flows therebetween. Damage or injury to the contact bands can then be detected because of a corresponding change in the quiescent current. This change is also registered by the monitoring device and can once more be used to initiate an alarm signal or to stop or reverse the drive for the door. This known entrapment prevention device responds, however, substantially only to a pressure applied in a specific direction or in a range of directions. Furthermore, relatively high actuating forces are required and the arrangement must be sealed on the edge of the door to avoid the ingress of water.

In addition as the insulating strips are preferably of foam rubber there is the significant danger of these strips suffering a permanent deformation on the occurrence of relatively high loads or during very cold conditions.

The principal object of the present invention is accordingly to provide an entrapment prevention device and a sensor therefor which reliably and reproducably results in electrical contact between the current carrying elements to initiate a switching signal irrespective of the direction in which pressure is exerted on its surface.

To accomplish this object the present invention envisages an entrapment prevention device for fastening to edge means associated with a closable opening, the device comprising first and second electrically conductive bands of which at least one is resilient, said bands being held spaced apart and facing each other so as to contact one another on the application of pressure and a monitoring circuit capable of detecting said contact, the device being characterized in that the first and second bands are in the form of an elongate helix-like structure.

The pair of first and second electrically conductive bands are preferably wound in elongate helix-like form around a core and the core is usually of generally cylindrical shape and made in resilient and flexible material. The pair of bands can of course conveniently be attached either to at least a part of the edge of the closable opening or to a part of an edge of the closure member therefor.

As a result of the helix-like construction the "sensor" has pressure sensitive points on all sides of the surface of the structure so that a contact between the two bands will always be produced irrespective of the radial direction in which the load is applied. Thus, when the sensor is incorporated in a vehicle door, a roller door, a sliding door or in a container closure or in a doorway, a stop or switch-over signal for the door drive is not only released if the trapped object exerts a force on the sensor in the direction of the closure movement, but also if a force is exerted on one or other side of the surface of the sensor. As a result the reliability with which a contact is produced is significantly increased. Moreover, when fitting the sensor of the invention it is not necessary to ensure that the sensor is installed at a specific angle about its longitudinal axis. Thus a reduction of the reliability of the device, by reason of faulty installation, can likewise be safely excluded.

Apart from the lack of dependence on the direction from which pressure is applied, the sensor is also extensively independent of its operating temperature. Furthermore, the sensor is able to switch rapidly and requires only a relatively low contact pressure to produce switching. The construction also lends itself to very economical mass production methods because the sensor can be manufactured in any desired length and can be cut to the desired dimensions. Because of the flexibility of the sensor it can readily be wound on drums with a radius of the order of 10 cm. Lengths of the sensor can be cut off from the drum as required.

The individual windings of the sensor are preferably spaced apart in the axial direction. The spacing between adjacent windings is advantageously such that a pressure sensitive region of the sensor is nevertheless present on the diametrically opposite side thereof. This construction is, on the one hand, relatively economical because the provision of a spacing between the windings ensures that the length of the pair of bands required per unit length of the elongate structure is smaller than would otherwise be the case, and, on the other hand, results in an electrical advantage because the lack of contact between the neighbouring windings ensures clear electrical conditions which are particularly significant if, in known manner, a resistor is used to bridge the pair of strips.

In accordance with an aspect of the invention the separation in the axial direction between neighbouring windings should not be too large because otherwise regions are present between the windings which do not respond to an external pressure. Thus, if the separation between the individual windings is restricted, it is possible to ensure that a pressure sensitive region exists at a diametrically opposite position. Providing the sensor is supported on a firm base pressure applied on one side of the sensor between two windings will nevertheless result in contact occurring between the two bands at a diametrically opposite position.

The spacing between the individual windings as measured in the axial direction, should in any case be less than the width of the pair of bands, and should preferably be in the range from ½ to ¼ of this width and in particular should be approximately equal to ⅓ thereof.

The radially inner one of the pair of bands is preferably continuous whereas the other, radially outer band preferably has slots extending transversally to its longitudinal direction and spaced apart at relatively small distances from one another by web parts. In this way the resilience of the sensor is increased and contact is more readily produced between the bands. The webs are usefully of a width in the range from ½ to ¼ of the width of the slots and in a particularly preferred embodiment have a width substantially equal to ⅓ of the width of the slots. Continuous marginal regions are preferably provided at the ends of the slots and the width of these marginal regions preferably lies in the range from 1/5 to ⅛ of the length of the slots, a value of approximately 1/6 of the length of the slots being preferred.

In accordance with an especially preferred embodiment the first and second electrically conductive bands are held spaced apart by strips of insulation arranged therebetween. The strips of insulation are preferably located in the slot free regions between the continuous inner band and the marginal regions of the outer band. The strips of insulation are preferably of a substantially non-compressible material so that contact between the bands is achieved by bending of the webs. In this manner it can be ensured that the arrangement is substantially independent of the operating temperature and also that it functions faultlessly even during colder conditions. The formation of the webs on the radially outer band ensures that only a relatively small contact pressure is required to actuate the sensor.

It is particularly advantageous if a cushion band is wound round the pair of electrically conductive bands. In this arrangement the individual windings of the cushion band usefully directly contact one another. In an alternative embodiment the cushion band can also be formed as a continuous cushion sleeve.

The elastic cushion band also favors actuation in the insensitive intermediate spaces of the pair of electrically conductive bands. As a result the core will be displaced in the direction of applied pressure against the elastic cushion band. Because a pressure sensitive region is present diametrically opposite to each space between the windings of the pair of electrically conductive bands the movement of the core and the resulting cushion pressure are sufficient to actuate the sensor.

It is particularly advantageous if the entire arrangement is housed in a thin-walled flexible tube and if the end faces of the arrangement are sealed against the ingress of water. This can, for example, be achieved by embedding the end faces in a synthetic casting resin or the like. In this manner an absolutely water-tight arrangement is provided which can be installed in a doorway or receiving section of the door without further sealing measures being necessary. The sealing is not lost even if the elongate sensor should become loosened from the edge of the door or the doorway. The profile of the edge of the door i.e. the receiving groove for the sensor is thus not itself required to effect a sealing function and this must be regarded as a significant operational advantage.

It is also particularly important that the function of the elongate entrapment prevention device of the invention is fully maintained, even if the outer profile is damaged.

A specific embodiment of the invention will now be described by way of example only and with reference to the accompanying drawings in which are shown:

FIG. 1: a partially broken away side view of an entrapment prevention device in accordance with the present teaching in which a quiescent current resistor and an electrical monitoring circuit are also illustrated in block form, FIG. 2: an axial section of the subject of FIG. 1 taken to one side of the central longitudinal axis 21 and FIG. 3: a perspective partial view of a preferred embodiment of the radially outer electrically conductive band of the entrapment prevention device of FIGS. 1 and 2.

As seen in the drawings the entrapment prevention device comprises a sensor device which features a sensor member defined by first and second electrically conductive bands 13 and 14 which are wound as a pair 11 into an elongate helix-like structure about a flexible cylindrical core 12. The radially outer and inner, first and second, electrically conductive bands of the sensor 11 are held spaced apart by two insulating strips 17 which extend along the edges of the radially inner electrically conductive band 13. The radially outer electrically conductive band 14 has transverse slots 15 uniformly arranged at relatively small intervals along its length. At least the radially outer electrically conductive band 14 must be of resilient spring material so that the spring webs 16 can bend resiliently inwardly on the application of a radial pressure and thus make electrical contact with the radially inner electrically conductive band 13.

Although it is basically possible to wind the inner band 13; the insulating strips 17 and the outer band 14 one after the other on the core, it is, however, preferred if the pair of bands together with the insulating strips are formed into a single structure in a previous working step and if this structure is then wound in threadlike or helical fashion round the core 12.

An axial distance 'a' is present between the individual windings of the sensor 11 and this distance should at most be of such a size that a web 16 is always present at least at one of any desired pair of diametrically opposite points.

A cushion band or strip 18 is conveniently wound in helical form around the previously described arrangement, so that edges of adjacent windings directly contact one another, as can be seen from FIGS. 1 and 2. A thin-walled rubber tube 19 is drawn over the entire length of this elongate arrangement in order to seal the sensor against the ingress of water. The end faces are made water-tight as at the position 20 for example by embedding them in a casting resin.

As can be seen at the upper end of FIG. 1 the two electrically conductive bands 13 and 14 are bridged by a quiescent current resistor 22 which is only schematically illustrated in the drawing.

At the outer end face of the sensor of FIG. 1 a pair of leads 23 respectively from the first and second electrically conductive bands 13 and 14 to a monitoring circuit 24 which is connected at 25 to a power supply. A relay 26 is used to stop or to reverse an automatic drive such as the drive for an automatic door with which the sensor is associated. Further sensors can be connected to the one monitoring circuit, as indicated at 23', 23" and 23'''. This sort of arrangement is, for example, particularly useful in connection with a motor car having four automatic closing windows.

As soon as a pressure is exerted in a radial direction on one of the webs 16 the corresponding input circuit to the control apparatus 24 is closed. As a result the relay 26 is energized and brings about the desired stopping or switching over of the automatic drive to which the sensor is attached.

If the sensor is so severely damaged at one position or another that current flowing from the monitoring circuit to the quiescent resistor 22 is interrupted, then a warning signal is likewise generated by the monitoring circuit 24 which signal can, for example, either stop the automatic drive or can register the damage in some other manner.

The above described helical arrangement results in a sensor which is sensitive to a pressure applied anywhere along its length and anywhere around its full periphery of 360°. After winding the pair of electrically conductive bands around the core 12 a curved spring surface is achieved which is relatively resistent to bending but which is, however, divided by the slots 15 into easily deflected spring webs 16. The switching force, i.e. the contact pressure, required on the sensor to produce switching can be selected as desired by appropriately dimensioning the spring webs 16.

The quiescent resistor 22 is usefully formed by a conducting flexible material, for example a conductive foil which is arranged between the two bands in place of the insulating strips at the end of the elongate structure remote from the terminal connections thereto.

It will be appreciated that various modifications may be made to the construction herein described without departing from the scope of the present teaching. In particular, although the sensor is conveniently formed by helically winding the pair of electrically conductive bands around the core, it also be made by firstly rolling a sheet-like structure into a cylinder and subsequently helically cutting the cylinder into a plurality of elongate helix-like structures.

What we claim is:

1. An entrapment prevention device for fastening to edge means associated with a closable opening, the device comprising: first and second electrically conductive bands of which at least one is resilient, said bands being held spaced apart and facing each other so as to contact one another on the application of pressure, and a monitoring circuit capable of detecting said contact, the first and second bands being each in the form of an elongate helix-like structure, with one band covering the other substantially over their entire length.

2. An entrapment prevention device according to claim 1 and characterized in that said first and second bands consist of sheet metal strip.

3. An entrapment prevention device in accordance with claim 1 and characterized in that said first and second bands consist of spring metal strip.

4. An entrapment prevention device in accordance with claim 1 and characterized in that a core extends along the axis of said helix-like structure.

5. An entrapment prevention device in accordance with claim 1 and characterized in that said first and second bands are wound on a core.

6. An entrapment prevention device in accordance with claim 4 and characterized in that said core is substantially cylindrical.

7. An entrapment prevention device in accordance with claim 4 and characterized in that said core is flexible.

8. An entrapment prevention device in accordance with claim 4 and characterized in that said core is resilient.

9. An entrapment prevention device in accordance with claim 1 and characterized in that the individual turns of the helix-like structure are spaced apart in axial direction thereof.

10. An entrapment prevention device in accordance with claim 9 and characterized in that the spacing between the individual turns in the axial direction is such that a pressure sensitive region of the helix-like structure exists at least at one of any pair of diametrically opposite points around said structure.

11. An entrapment prevention device for fastening to edge means associated with a closable opening, the device comprising: first and second electrically conductive bands of which at least one is resilient, said bands being held spaced apart and facing each other so as to contact one another on the application of pressure, and a monitoring circuit capable of detecting said contact, the first and second bands being each in the form of an elongate helix-like structure, the individual turns of the helix-like structure being spaced apart in axial direction thereof, and the axial distance between individual windings of the helix-like structure being smaller than the width of said first and second bands.

12. An entrapment prevention device in accordance with claim 11 and characterized in that the axial distance separating the individual windings lies in the range from $\frac{1}{2}$ to $\frac{1}{4}$ of the width of said first and second strips.

13. An entrapment prevention device in accordance with claim 12 and characterized in that the axial distance separating the individual windings is substantially equal to $\frac{1}{3}$ of the width of said first and second strips.

14. An entrapment prevention device in accordance with claim 1 and characterized in that the radially inner one of said first and second electrically conductive bands is a continuous band.

15. An entrapment prevention device for fastening to edge means associated with a closable opening, the device comprising: first and second electrically conductive bands of which at least one is resilient, said bands being held spaced apart and facing each other so as to contact one another on the application of pressure, and a monitoring circuit capable of detecting said contact, the first and second bands being each in the form of an elongate helix-like structure, the outer one of said first and second electrically conductive bands having a plurality of slots disposed transversally to its longitudinal direction and spaced apart by webs at relatively small intervals.

16. An entrapment prevention device in accordance with claim 15 and characterized in that the webs between individual slots have widths in the range from $\frac{1}{2}$ to $\frac{1}{4}$ of the widths of said slots.

17. An entrapment prevention device in accordance with claim 16 and characterized in that the webs have a width substantially equal to ⅓ of the widths of said slots.

18. An entrapment prevention device in accordance with claim 16 and characterized in that said slots extend transversally between continuous marginal regions, said marginal regions having a width in the range from 1/5 to 1/8 of the length of said slots.

19. An entrapment prevention device according to claim 18 and in which said marginal regions have a width substantially equal to 1/6 of the length of said slots.

20. An entrapment prevention device in accordance with claim 1 and characterized in that insulating strips are inserted between said first and second bands between the marginal edges thereof.

21. An entrapment prevention device in accordance with claim 16 and characterized in that said slots extend between continuous marginal regions of said band and that insulating strips are inserted between said marginal regions and the other one of said bands.

22. An entrapment prevention device in accordance with claim 1 and characterized in that said helix-like structure is enclosed in an outer cushion sleeve.

23. An entrapment prevention device in accordance with claim 1 and characterized in that a cushion strip is wound over said elongate helix-like structure.

24. An entrapment prevention device in accordance with claim 22 and characterized in that a thin-walled tube is drawn over said cushion sleeve.

25. An entrapment prevention device in accordance with claim 24 and characterized in that the end faces of the device are sealed against the ingress of water.

26. A sensor for use in an entrapment prevention device, said sensor comprising first and second electrically conductive bands of which at least one is resilient, said bands being held spaced apart and facing each other so as to contact one another on the application of pressure, the first and second bands being each in the form of an elongate helix-like structure, with one band covering the other substantially over their entire length.

* * * * *